US007126144B2

(12) United States Patent
De Coi

(10) Patent No.: US 7,126,144 B2
(45) Date of Patent: Oct. 24, 2006

(54) METHOD FOR THE CONTACTLESS MEASUREMENT OF AN OBJECT

(75) Inventor: Beat De Coi, Sargans (CH)

(73) Assignee: Cedes AG, Landquart (CH)

( * ) Notice: Subject to any disclaimer, the term of this patent is extended or adjusted under 35 U.S.C. 154(b) by 0 days.

(21) Appl. No.: 10/545,702

(22) PCT Filed: Jan. 7, 2004

(86) PCT No.: PCT/CH2004/000003

§ 371 (c)(1),
(2), (4) Date: Aug. 17, 2005

(87) PCT Pub. No.: WO2004/074769

PCT Pub. Date: Sep. 2, 2004

(65) Prior Publication Data

US 2006/0145101 A1 Jul. 6, 2006

(30) Foreign Application Priority Data

Feb. 24, 2003 (CH) .............................. 2003 0284/03

(51) Int. Cl.
*G01N 21/86* (2006.01)
*G01B 11/04* (2006.01)

(52) U.S. Cl. ........................... 250/559.12; 250/559.22; 250/221; 356/625

(58) Field of Classification Search ................ 250/221, 250/222.1, 559.12–559.15, 559.22, 559.24–559.27; 356/606–608, 613, 628, 629, 634, 635, 638, 356/639, 640; 340/933, 937, 942, 943; 29/407.04, 29/709, 407.05; 702/156–159, 166, 167, 702/170–172
See application file for complete search history.

(56) References Cited

U.S. PATENT DOCUMENTS

| 4,555,633 | A | | 11/1985 | Björkelund |
| 5,142,159 | A | * | 8/1992 | Veit et al. .............. 250/559.15 |
| 5,266,810 | A | * | 11/1993 | Murphy ................. 250/559.24 |
| 5,389,789 | A | * | 2/1995 | Nguyen ................... 250/341.1 |
| 5,448,078 | A | * | 9/1995 | Nakazawa ............. 250/559.24 |
| 6,414,603 | B1 | * | 7/2002 | Yamaguchi et al. ..... 340/815.4 |
| 6,784,415 | B1 | * | 8/2004 | Kudo et al. ................. 250/221 |
| 6,965,438 | B1 | * | 11/2005 | Lee et al. ................... 356/625 |

FOREIGN PATENT DOCUMENTS

DE        32 38 883 C2    7/1983

* cited by examiner

*Primary Examiner*—Stephone B. Allen
(74) *Attorney, Agent, or Firm*—Buchanan Ingersoll & Rooney PC

(57) ABSTRACT

The invention relates to a method for the contactless measurement of an object in at least one dimension. An object is scanned in a spatially restricted effective zone of a scanning beam field and the size of the object in terms of the measured dimension is deduced by the detection of one or more interruptions in the scanning beams. The scanning beam field is constructed from a number of directly addressable individual beams. The beam-assisted scanning of the spatially restricted effective zone of the scanning beam field is carried out according to a predefinable pattern of steps, using a non-linear soiling method.

14 Claims, 2 Drawing Sheets

METHOD FOR THE CONTACTLESS MEASUREMENT OF AN OBJECT

RELATED APPLICATIONS

This application claims priorities under 35 U.S.C. §119 to Swiss Application No. 284/03, filed Feb. 24, 2003, and Under 35 U.S.C. §371 to PCT Application No. PCT/CH2004/000003, filed as an International Application on Jan. 7, 2004, designating the U.S., the entire contents of which are hereby incorporated by reference in their entireties.

The invention relates to a process for contactless measurement of an object as claimed in the preamble of claim 1.

In industrial processes it is often necessary to determine the extension of an object in height and/or width and/or length in a first approximation, so that it can be considered accordingly in a following transport, storage and/or processing step. For example, in an automatic warehouse system the height of the object to be stored must be determined. Many objects cannot be measured using sensors with contacts or the like, but contactless methods must be used. Therefore, for example, light gratings or light curtains which are passed by the object are used for these automated measurement processes. Measurement takes place by ascertaining the beam interruptions from which the measurement in the respective dimension can be deduced. In height measurement, the object projects generally from underneath into the light grating since it is being transported on a pallet or a conveyor belt through the light grating or the light curtain. Height measurement is finding the uppermost interrupted or lowermost uninterrupted light beam. To do this, in a light grating or light curtain the individual light beams are scanned in sequence in order to ascertain the interruptions. The scanning of a light beam consists in activating a transmitting element and at the same time evaluating an opposite receiving element for the transmitted light beam. The theoretical duration of a scan, the scanning time, is formed from the scanning time per light beam multiplied by the number n of light beams, plus the evaluation time. The equation for it reads:

$$t_{Scan} = t_{Beam} \times n + t_{Evaluation}$$

It can happen that the object which is to be automatically measured then travels exactly into the detection area of a light beam after it has been scanned.

In order to preclude this error source and still detect the object, the entire light grating must be scanned a second time. Thus, in practice the maximum detection time is twice the scanning time. The equation for the detection time is:

$$t_{detection} = t_{Scan} \times 2 = (t_{Beam} \times n + t_{Evaluation}) \times 2$$

In practice the scanning time per light beam is roughly 100 microseconds; the number n of beams of the light grating is for example 32; the evaluation time is typically roughly 500 microseconds. With these typical practical values for the maximum detection time $t_{detection}$ the value is 7.4 ms. Here it should be noted that this value is the maximum detection time for determining the extension in only one dimension, the height. Often it can be necessary to determine the dimensions of an object in two dimensions or even in all three dimensions. It is immediately apparent from this that the current process for contactless measurement of an object is relatively time-consuming.

The object of this invention is therefore to avoid this disadvantage of the process of the prior art. A process for contactless measurement of an object in at least one dimension will be devised which enables an increase in measurement speed with the accuracy remaining the same and which leads overall to a shortening of the maximum detection time.

This object is achieved in a process for contactless measurement of an object which has the features cited in the characterizing section of claim 1. Developments and/or advantageous versions of the invention are the subject of the dependent claims.

The invention proposes a process for contactless measurement of an object (6) in at least one dimension in which the object (6) is scanned in a three-dimensional limited action area of a scanning beam field (1) and from the detection of one or more interruptions of the scanning beams (L) the size of the object (6) in the measured dimension is deduced. The scanning beam field (1) is built up from a number of directly addressable individual beams (L). The beam scanning of the three-dimensionally limited action area of the scanning beam field (1) takes place according to a definable step pattern using a sorting process which is different from a linear sorting process. One preferred process consists in using a binary search process.

The detection time for measurement of an object is largely determined by the duration and the number of scanning steps. A reduction of the scanning steps in the determination of object size therefore acts directly on the time interval required for this purpose. The scanning process for determination of the beam interruptions is reduced to a nonlinear sorting process since the action area of the scanning radiation can be regarded as a scanning beam field which is made up of individual, directly addressable beams. Accordingly the principle of a nonlinear sorting process can be applied to this field.

In one especially advantageous process, for determining the size of the object in at least one dimension, the three-dimensionally limited action area of the scanning beam field is scanned in regions according to the binary search principle. The binary search process is based on a continuous halving of the search interval with simultaneous use of sorting. For this purpose the action area of the radiation field is broken down into a number of directly addressable individual beams which is assigned a continuously increasing or decreasing number for purposes of sorting. The individual beams can be actual measurement beams. They can however also be regarded as imaginary measurement beams when the object is detected for example by an imaging system and the generated image is electronically scanned "in beam form" for "beam interruptions". The binary search system is superior to the linear search system with respect to the time requirement. For a larger number of individual beams the time difference increases very quickly. While the operating time increases in proportion to the number of scanning beams in a linear search, it increases in a binary search only in relation to the logarithm of the number of scanning beams to the base 2.

Rather it is necessary to determine the size of the object in more than one dimension. To do this, the three-dimensionally limited action area of the scanning beam field is advantageously scanned by a combination of the principles of linear and binary search. Combining the linear and binary search takes into account the circumstance that the object which is to be measured is conventionally taansported into the scanning beam field in an arbitrary orientation. Therefore it is necessary first of all to determine in the respective dimension which is to be measured the start, i.e. the outermost edge of the object, from which the measurement of the object in the respective dimension are determined. This first step corresponds essentially to one origin determination at a time and is carried out sequentially in a linear search process. After the origin has been ascertained, the actual further measurement of the object can be simplified and shortened by using the binary search process.

To carry out the process as claimed in the invention the object to be measured is placed in a curtain fixed by the scanning beams. In doing so for example there is a fixed number of radiation sources at regular intervals on top of one another on one lengthwise side of the transport belt. On the other lengthwise side of the transport belt, opposite the radiation sources, the same number of detectors for the radiation emitted by the radiation sources are arranged on top of one another. The object which is to be measured in one dimension is moved via the transport belt into the area of the scanning beams and is measured there according to the process as claimed in the invention. For measuring the object in two or in all three dimensions also a flat or three-dimensional grating can be fixed.

The scanning beam field in the form of a curtain or a flat or three-dimensional grating is advantageously light in the visible or also in the invisible spectral range. Ultrasonic or radar radiation can also be used. It goes without saying that detectors tuned to the scanning radiation emitted by a radiation source are also used.

Rather it is not the object which is directly measured, but an image of the object is scanned. The image of the object is fixed by the picture area of an imaging system which can be scanned one- or two-dimensionally. For example the imaging system is a recording camera, an image of the object in a scanning tunnel microscope or from an electron-power microscope. The image of the object can however also be produced by inductive measurement, for example for ferromagnetic materials, or by a capacitive measurement for nonconducting or poorly conducting substances. Basically all images of an object which reproduce its actual appearance or the extent of a measurement quantity of interest can be used for measurement.

It is advantageous if the number of scanning beams for each dimension of the object to be measured is at least eight. The binary search system is superior with respect to time demands starting roughly from the number of eight scanning beams. For larger numbers of scanning beams the time difference increases very quickly. While in a linear search the operating time is proportional to the number of scanning beams, it increases in a binary search only in relation to the logarithm of the number of scanning beams to the base 2.

By the object's being moved into the three-dimensionally limited action area of the scanning beam field such that at least in one of its dimensions which are to be determined the object boundary coincides with the edge boundary of the three-dimensionally limited action area of the scanning beam field, establishing the zero line for this dimension is abandoned. To determine the size of the object in this dimension the binary search process can be immediately used. In the ideal case of a cuboidal or cubic object it can even be placed at the origin of the three-dimensional scanning beam field such that for all dimension determinations the establishment of the zero line can be abandoned. But generally there are more or less irregularly shaped objects which are moved in an arbitrary orientation and position on the transport means into the scanning beam field. In doing so it means a great simplification for the measurement process if for example when an object is being transported via a transport belt the scanning beam field component is bordered by the transport belt surface over the horizontally running transport belt surface which is generally used for determining the height of an object. The scanning beam with the index 1 runs in the immediate vicinity and parallel to the transport belt surface from one lengthwise side of the transport belt to the other. The other scanning beams for determining the height of the object are arranged vertically over it and are numbered continuously increasing.

Measurement of the object can take place on the resting object. For reasons of more rapid throughput, it is however advantageous if relative motion takes place between the object which is to be measured and the scanning beam field during the measurement. This can be achieved for example by the object's being continuously transported through the action area of the scanning beam field. Transport of the action area of the scanning beam field over a resting object is also possible. For example, in automatic washing systems the vehicle is often stationary and the measurement device which records the vertical and horizontal contour of the vehicle is moved over the object. Then in the following washing step the vertical and horizontal brushes are controlled with the stored image. A similar application arises in automatic enamelling lines where the object to be enamelled is first measured at rest and then is enamelled in the enamelling chamber based on the stored image. The relative speed is matched to the maximum detection time for measuring the object. With conventional transport means the residence time of the object which is to be measured in the measurement beam field is much larger than the detection time when the process as claimed in the invention is being used.

Other advantages and features of the invention result from the following description of one sample version of the process as claimed in the invention. The schematics are used to illustrate the process.

Figure 1:
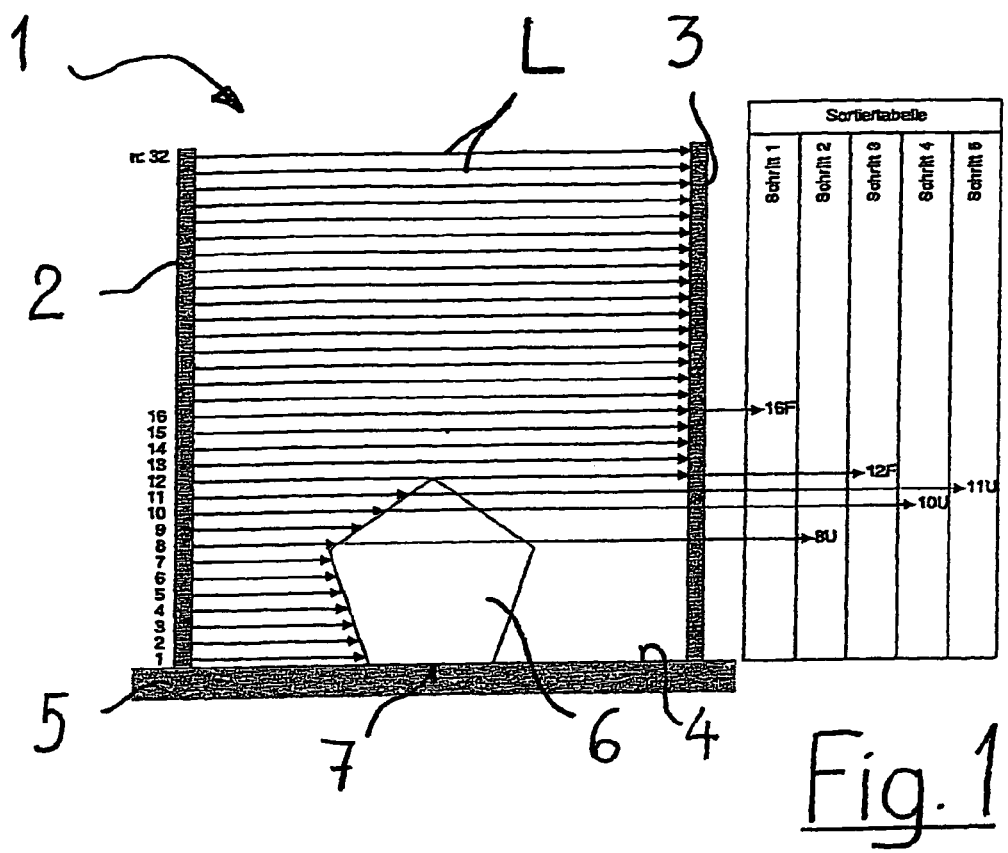
FIG. 1 shows a horizontally arranged curtain of electromagnetic scanning radiation with an object located in it and a corresponding assigned search table.

FIG. 1 shows a horizontally running, curtain-like scanning beam field which is provided overall with reference number 1. The scanning beam field 1 is fixed by individual scanning beams L which are each emitted by a transmitting element 2 and are detected by the opposite receiver 3. The scanning beam field can be an electromagnetic beam field, for example a curtain of light or radar beams, or an ultrasonic beam field. The individual scanning beams can be directly addressed. The individual scanning beams L run at the same distance from one another. In the illustrated embodiment the scanning beam field comprises a total of 32 individual scanning beams L. Instead of the receiver 3 there could also be reflecting elements which reflect the emitted scanning beams L back to the transmitter 2. In this case each transmitter is moreover also made as a receiver. Transmitters 2 and receivers 3 extend above a transport means 5 for an object 6 which is to be measured and which rests with its bottom 7 on its surface 4. For example the transport means 5 is a transport belt or a pallet or the like. The scanning beams L run roughly parallel to the surface 4 of the transport means 5. The scanning beam field 1 extends essentially vertically over the transport means 5. The lowermost scanning beam L runs in the immediate vicinity to the surface 4 of the transport means 5. The height of the object 6 can be determined with a curtain-like scanning field 1 which is built up in this way. This is necessary for example for automatic storage of the object 6 in order to select a compartment of suitable height.

With the illustrated arrangement the height determination of the object is reduced to ascertaining the number of interrupted scanning beams L. To do this, the scanning beams L beginning from the surface 4 of the transport means 5 are consecutively numbered with increasing numbers. The scanning beam L which runs in the immediate vicinity of the surface of the transport means acquires for example the index n=1. The subsequent scanning beam L is labelled 2, etc. The uppermost scanning beam L which borders the action area of the scanning beam field 1 to the top bears the index n=32. It goes without saying that consecutive numbering can also be undertaken in the reverse sequence.

To determine the height of the object 1, thus proceeding from the first interrupted scanning beam L with the index N=1, the uppermost interrupted scanning beam L or the first scanning beam L which has freely passed to the receiver 6 must be determined. For the sequential search process known from the prior art, the individual scanning beams L are scanned sequentially in order to ascertain the interruptions. The scanning consists in activating a transmitting element 2 and at the same time evaluating an opposing receiving element 3 for the emitted scanning beam L. The theoretical duration of a scan, the scanning time, is found from the scanning time per scanning beam multiplied by the number n of scanning beams plus the evaluation time. The equation for this reads:

$$t_{Scan} = t_{Beam} \times n + t_{Evaluation}$$

It can happen that the object which is to be automatically measured then travels exactly into the detection area of a scanning beam L after it has been scanned. In order to preclude this error source and still recognize the object, the entire scanning beam field 1 must be scanned a second time. Thus in practice the maximum detection time is twice the scanning time.

The equation for the detection time is:

$$t_{detection} = t_{Scan} \times 2 = (t_{Beam} \times n + t_{Evaluation}) \times 2$$

In practice, the scanning time per light beam is roughly 100 microseconds; the number n of beams of the light grating is for example 32; the evaluation time is typically roughly 500 microseconds. With these typical practical values for $t_{detection}$ the value is 7.4 ms.

To differentiate from the linear search process of the prior art, the invention proposes a non-linear search process, especially a binary sorting process. It is based essentially on continuous halving of the search interval with simultaneous use of sorting of the scanning beams. First of all, the interval of a total of 32 scanning beams L is cut in half and the scanning beam with the index n=16 is activated and interrogated. When this scanning beam L can travel freely to its receiver element 3, it is deduced that the object 6 extends only in the lower half of the scanning beam field 1 with the scanning beams with the index 1 to 16. In the sorting table shown in FIG. 1 the freely passing scanning beam is marked as 16F. In the second step the lower half of the scanning beam field, the lower interval, is cut in half again and the scanning beam L with the index 8 is activated and interrogated. In doing so it is ascertained that the scanning beam with the index 8 is interrupted. This is given in the sorting table by 8U. It is inferred from this result that the top end of the extension of the object 6 must lie in the interval of the scanning beams with the index n=9 to n=16. This interval is cut in half and the scanning beam with the index n=12 is interrogated. In doing so it is ascertained that this scanning beam can pass freely. This is noted in the sorting table with 12F. In step 4 therefore the interval between the scanning beam with the index 12 and the scanning beam with the index 8 is cut in half and the scanning beam with the index 10 is interrogated. In doing so it is ascertained that it is interrupted; this is noted in the sorting table with 10U. Thus, in step 5 the interval between the interrupted scanning beams with the index n=10 and the next free scanning beam with the index n=12 remains to be examined. This ultimately leads to a scanning beam with index n=11. In doing so it is ascertained that it is likewise interrupted; this is entered in the sorting table with 11U. Thus, using the search process as claimed in the invention, in only 5 steps it was possible to ascertain that the end of the upper extension of the object 6 which is to be measured with respect to its height lies between the scanning beams with the index n=11 and the index n=12. Thus, the height of the object is determined up to an accuracy of approximately the distance of the two adjacent scanning beams L.

The detection time is fixed by the following equation $$t_{detection} = t_{Scan} \times 2 = (t_{Beam} \times n + t_{Evaluation}) \times 2$$

With the value n=5 for the number of individual scans there is a detection time $t_{detection} = 2$ ms for the described embodiment. This corresponds to a time savings of 5.5 ms or 73% compared to the linear search process.

Figure 2:
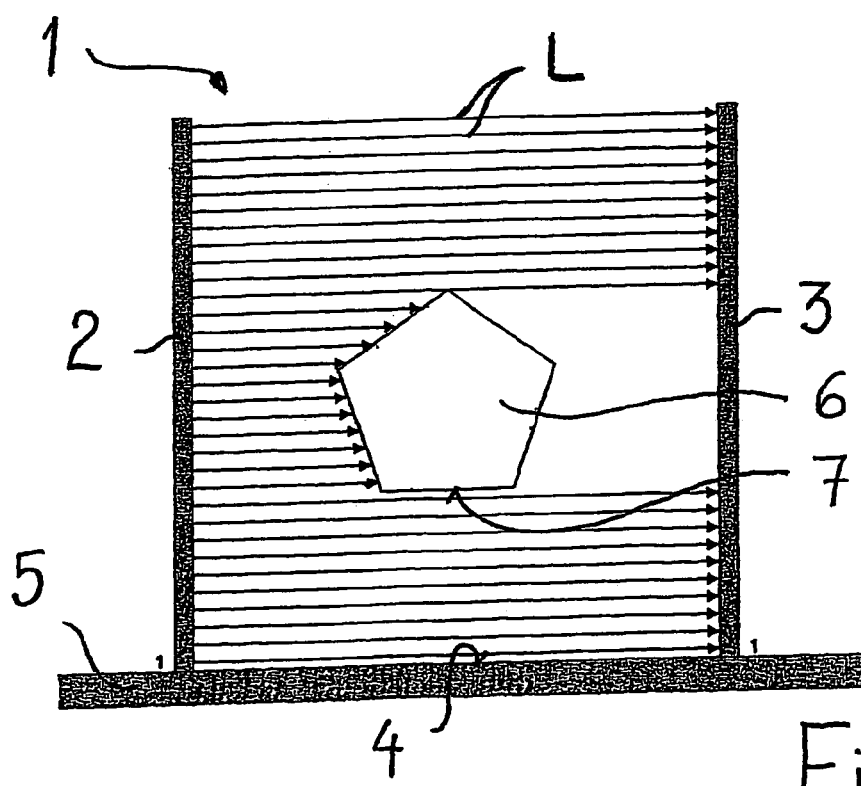
FIG. 2 shows an object which is arranged arbitrarily in the scanning beam field.

The process as claimed in the invention can be carried out most quickly when an object boundary coincides with the detection boundary of the electromagnetic radiation field in the dimension which is to be determined. This criterion is generally satisfied for one-dimensional height determinations. But if the extension in another dimension or in two or in all three dimensions is to be determined, the object is usually somewhere in the detection area of the electromagnetic field. This situation is shown for example in FIG. 2 in which it is in turn the determination of the height of the object. In this case, first of all using the known linear search process, the lower or the upper start of the object is determined. If this is the limit of the extension, the scanning beam assigned to this position is defined as the zero line. Further dimension determination can then take place according to the above described process as claimed in the invention. First of all, only the object within the scanning beam field can be sought. The upper and the lower object boundary can then be determined up and down according to the process as claimed in the invention. In the case described using the example as shown in FIG. 2, the time savings compared to the pure linear process does not reach the maximum possible value. The time which is necessary for combined linear and binary search is however also always less than the use of the linear search process alone.

Figure 3:
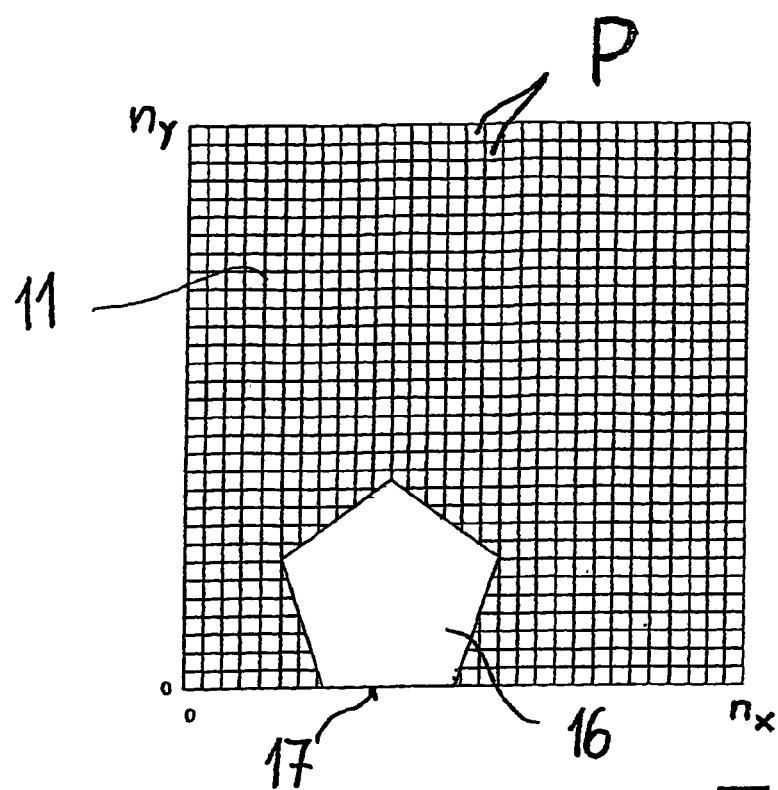
FIG. 3 shows an imaging system for measuring an object.

FIG. 3 shows an image 16 of the object, for example the picture of a scanning camera It could also be the image of an object as is produced in scanning tunnel microscopy or in an electron-power microscopy. Other images of an object can originate for example from inductive measurements for ferromagnetic substances or from capacitive measurements for nonconducting or poorly conducting substances. In contrast to a scanning beam process, here the image 16 of the object can be scanned or interrogated in two dimensions.

The quantities $n_y$ and $n_x$ indicate the line and column number of the picture. The lines and columns are built up from individual image elements (pixels) and can be directly addressed. The object base 17 coincides with the line detection boundary of the scanning beam field 11. Therefore the search process as claimed in the invention in the line direction (y-direction) can be carried out by analogy with the search process explained using FIG. 1. With respect to the scanning columns $n_x$ the conditions are similar to those which were explained using FIG. 2. To determine the dimension of the object in the column direction (x-direction) therefore first the image 16 of the object must be found. This takes place for example again via a linear search process. If the image 16 of the object is found in the two-dimensional scanning beam field 11, determination of the object boundaries can be done again using the process as claimed in the invention.

The process as claimed in the invention can be used in one-dimensional scanning beam fields, such as light curtains for example, likewise in two-dimensional or three-dimension scanning fields. A two-dimensional scanning field can be fixed for example by a light grating or can be formed by an imaging system, for example a recording camera, a scanning tunnel microscope or an electron-power microscope. Images from inductive or capacitive measurements and similar analyses can also be used for measurement. The scanning radiation can be electromagnetic radiation, for example light in the visible and in the invisible spectrum, or radar, or ultrasonic radiation. The process as claimed in the invention can be used for any type of sensor which fixes a linear, flat or three-dimensional scanning field. The object can be at rest during the measurement. Due to the high speed of the process, the objects can also be moved through the scanning field.

Figure 4:
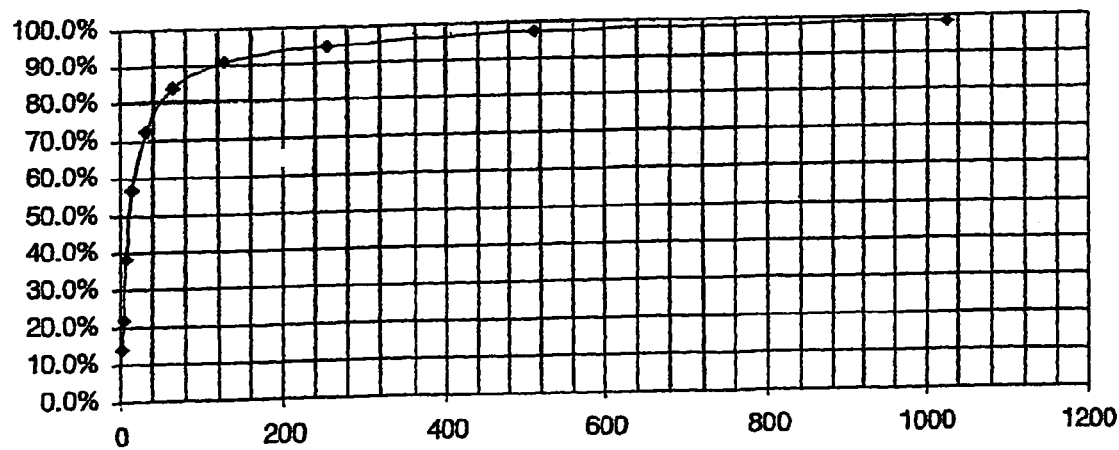
FIG. 4 shows a diagram for explaining the time savings when the process as claimed in the invention is used.

FIG. 4 shows in diagram form the time savings when the process as claimed in the invention is used compared to the linear search process. The data relate to a one-dimensional measurement in which an object boundary coincides with the detection boundary of the scanning beam field. The x axis plots the number of scanning beams; the y axis shows the time savings in %. Here reference is made to a purely linear search process for the same number of scanning beams. It is immediately apparent that the process as claimed in the invention entails enormous advantages in speed so that even smaller objects which move relatively quickly through the scanning beam field can be detected and measured.

What is claimed is:

1. Process for contactless measurement of an object in at least one dimension, comprising:
   scanning the object in a three-dimensionally limited action area of a scanning beam field; and
   detecting one or more interruptions of scanning beams and deducing a size of the object in the measured dimension, wherein the scanning beam field is built up using a number of directly addressable individual beams, and wherein scanning takes place according to a definable step pattern and a non-linear sorting process.

2. Process as claimed in claim 1, wherein determination of the size of the object takes place in at least one dimension by scanning the scanning beam field in regions according to a binary search principle.

3. Process as claimed in claim 2, wherein the size of the object is determined in more than one dimension and the three-dimensionally limited action area of the scanning beam field is scanned by a combination of principles of linear and binary search.

4. Process as claimed in claim 1, wherein the object is placed in the action area of a beam curtain which is fixed by individual scanning beams or of a two-dimensional or three-dimensional beam grating.

5. Process as claimed in claim 1, wherein the object is moved into a scanning beam field of electromagnetic radiation or of ultrasonic radiation.

6. Process as claimed in claim 1, wherein the object is moved into a scanning beam field of electromagnetic radiation in the visible or invisible spectral range or radar radiation.

7. Process as claimed in claim 1, wherein an image of the object which is to be measured is scanned.

8. Process as claimed in claim 7, wherein the image of the object is fixed by a picture area of an imaging system which can be scanned one- or two-dimensionally, using at least one of a recording camera, an image of a scanning tunnel microscope or an electron-power microscope, or a capacitive or inductive measurement which is implemented graphically.

9. Process as claimed in claim 1, wherein the number of scanning beams for each dimension of the object to be measured is at least eight.

10. Process as claimed in claim 1, wherein the object is moved into the three-dimensionally limited action area of the scanning beam field such that in at least one of its dimensions which are to be determined an object boundary coincides with an edge boundary of the three-dimensionally limited action area of the scanning beam field.

11. Process as claimed in claim 1, wherein during measurement, relative motion takes place between the object which is to be measured and the scanning beam field.

12. Process as claimed in claim 11, wherein the object which is to be measured is transported during the measurement, continuously, through the action area of the scanning beam field.

13. Process as claimed in claim 11, wherein the image of the object is recorded, stored and evaluated for measurement, and in a following step determined measurement data are used for control of handling and treatment processes for the object.

14. Process as claimed in claim 12, wherein the image of the object is recorded, stored and evaluated for measurement, and in a following step determined measurement data are used for control of handling and treatment processes for the object.

* * * * *